UNITED STATES PATENT OFFICE.

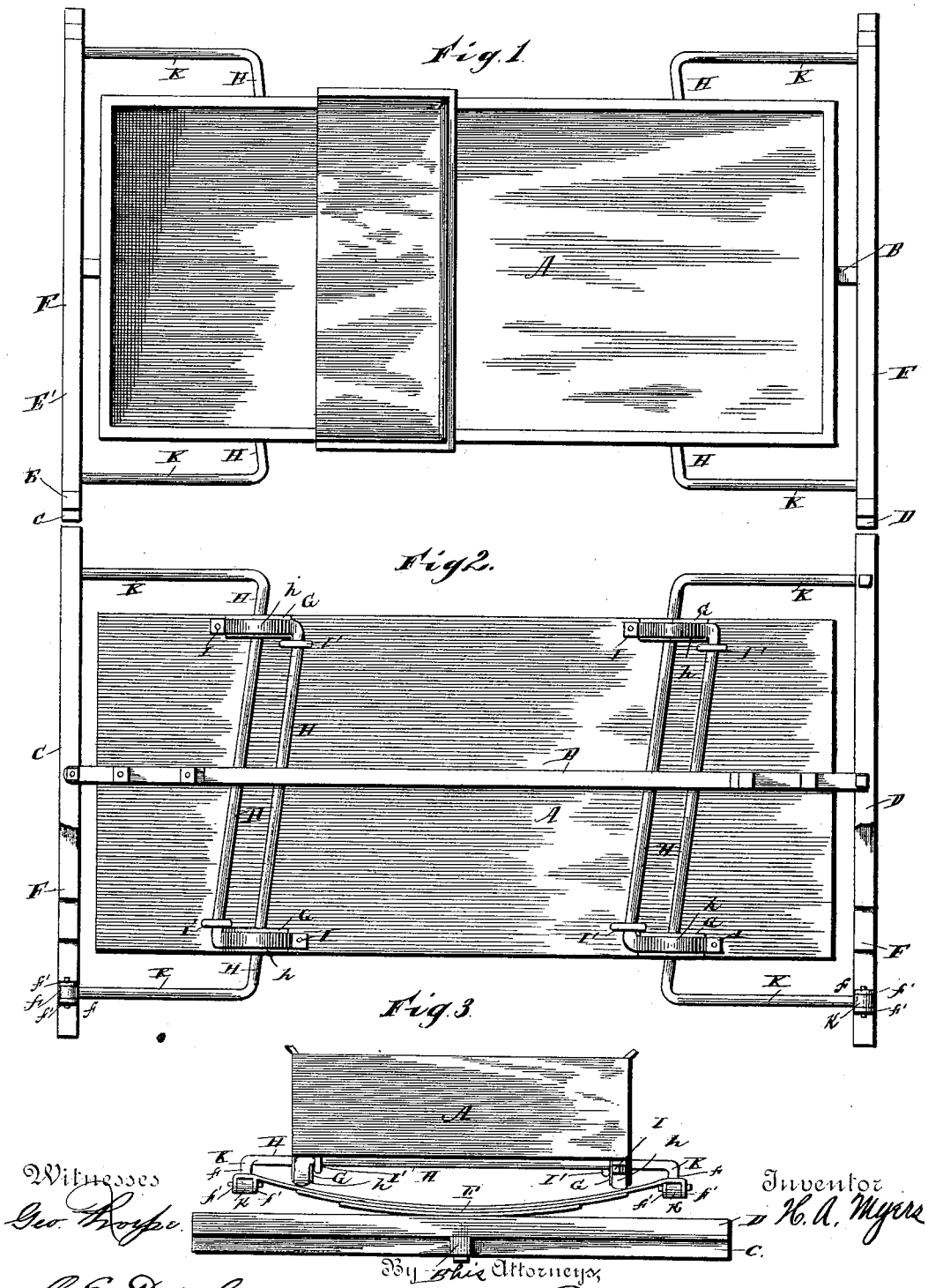

HARRY A. MYERS, OF FRANKLIN, PENNSYLVANIA.

VEHICLE-SPRING.

SPECIFICATION forming part of Letters Patent No. 366,500, dated July 12, 1887.

Application filed March 30, 1887. Serial No. 233,040. (No model.)

*To all whom it may concern:*

Be it known that I, HARRY A. MYERS, a citizen of the United States, residing at Franklin, in the county of Venango and State of Pennsylvania, have invented a new and useful Improvement in Vehicle-Springs, of which the following is a specification.

My invention relates to an improvement in vehicle-springs of that class known as "torsion springs," the novelty of which consists in the peculiar manner of attaching the same to the bed or body of the vehicle, to secure the most satisfactory results.

In the drawings hereto annexed, Figure 1 is a plan view of a wagon provided with my improvements. Fig. 2 is a reversed plan view of the same. Fig. 3 is a rear view thereof.

Referring to the drawings, in which similar letters denote corresponding parts in all the figures, A designates the body or bed of the wagon, B the reach, C the front, and D the rear axle, all constructed and arranged substantially as usual.

E represents the head-block of the wagon, having the half-spring E' on the upper side thereof, and F is a similar half-spring secured to the upper side of the rear axle. The ends of the said springs are provided with shackles $f$, comprising the depending parallel ears $f'$ $f'$, provided with aligned perforations.

G G represent brackets or blocks, four in number, secured to the under side of the bed or body on opposite sides and near the ends thereof, the said blocks each being provided with a transverse round opening or bearing.

H H represent torsion-springs, four in number, each of which passes through the bearing in one of the said blocks, and is thence carried across the bed of the vehicle, bent at right angles, and flattened to form the clip $h$ to pass over the block at that side of wagon and secure the same to the bottom of the said bed, by means of the bolt I and the staple or clip I', fastened through the said clip and into the body before mentioned. There being four of the said springs, each of which passes through one of the bearings in the blocks, the opposite ends of the said springs will each be secured over and serve to fasten one of the said blocks to the bed of the wagon. By making the said clips integral with the springs and adapting the same to secure the blocks in place the simplicity of construction is increased and the means of securement are also safer than the means heretofore provided.

Each torsion-spring is carried out a short distance beyond the block in which it is journaled, and is then bent at right angles to its length (parallel to the length of the body of the vehicle) and extended toward the nearest end of the said vehicle. Thus the ends of two of the springs will be at the front end of the wagon and the ends of the other two springs will be at the rear end of the wagon, as will be seen. These forwardly and rearwardly projecting arms K are provided on the ends with eyes $k$, which are placed between the ears $f'$ $f'$, and through which and the aligned perforations in the said ears are passed bolts to pivot the arms of the torsion-springs to the shackles on the extremities of the half-springs.

The primary object gained by using the leaf-springs in combination with the torsion-springs, as herein described, is that the said springs as constructed can be more readily attached to the head-block and axle than if the torsion-spring were secured directly to shackles on the said axle and head-block, for the reason that there is only a necessity for one bolt through the said axle and head-block at the center in this case, while in the other there is a bolt through the same for each shackle. Further, torsional elasticity in this combination, in addition to the direct elasticity of the leaf-springs, will produce a yielding and gently resilient motion of the body of the wagon unattainable by any spring or combination of springs heretofore used, and the construction thereof is also strong and sufficient to enable it to withstand any amount of rough travel.

The spring as described is in addition very durable, and, being exceedingly simple, may be manufactured very cheaply.

Having now described my invention, what I claim, and desire to secure by Letters Patent of the United States, is—

1. The combination, with the body of a vehicle, of the brackets or blocks on the under side thereof, having bearings or sockets for the springs therein, and the torsion-springs adapted to pass through the bearing in one of the said brackets and have the end at the opposite side of the body bent at right angles and flattened, to be fastened by bolts or otherwise over the said blocks and secure the same to the body of the vehicle, substantially as and for the purpose set forth.

2. The combination, with a vehicle, of the leaf-springs E' F, having the depending ears $f'f'$ at each end provided with aligned perforations, body A, journal-block secured thereto near the sides, torsion-springs H H, passing through the said blocks and having the arms K, provided with the eyes $k$, which are inserted between the ears $f''$, and the bolt passing through the said aligned openings in the ears and the said eye to pivot the arms K to the springs E' F, substantially as specified.

In testimony that I claim the foregoing as my own I have hereto affixed my signature in presence of two witnesses.

HARRY A. MYERS.

Witnesses.
   THOMAS McGOUGH,
   PHIL. ENGELSKUGER.